United States Patent [19]

Glenn

[11] Patent Number: 4,652,909
[45] Date of Patent: Mar. 24, 1987

[54] TELEVISION CAMERA AND RECORDING SYSTEM FOR HIGH DEFINITION TELEVISION HAVING IMAGERS OF DIFFERENT FRAME RATE

[75] Inventor: William E. Glenn, Fort Lauderdale, Fla.

[73] Assignee: New York Institute of Technology, Old Westbury, N.Y.

[21] Appl. No.: 661,656

[22] Filed: Oct. 17, 1984

Related U.S. Application Data

[63] Continuation-in-part of Ser. No. 597,482, Apr. 6, 1984, which is a continuation-in-part of Ser. No. 483,126, Apr. 8, 1983, Pat. No. 4,628,344, which is a continuation-in-part of Ser. No. 418,055, Sep. 14, 1982, Pat. No. 4,517,597.

[51] Int. Cl.$^4$ .............................................. H04N 9/09
[52] U.S. Cl. ...................................... 358/41; 358/12; 358/310; 358/50
[58] Field of Search ................. 358/12, 137, 85, 140, 358/141, 142, 11, 310, 50, 52, 43, 41

[56] References Cited

U.S. PATENT DOCUMENTS

| | | | |
|---|---|---|---|
| 3,037,564 | 6/1962 | Bruining | 358/41 |
| 3,449,509 | 6/1969 | Hobbs et al. | 358/52 X |
| 3,501,588 | 3/1970 | Elliott | 358/50 X |
| 3,586,763 | 6/1971 | Schneider | 358/52 |
| 3,624,285 | 11/1971 | Wolff | 358/83 |
| 3,793,478 | 2/1974 | Verhoeven | 358/12 |
| 4,068,258 | 1/1978 | Bied-Charreton et al. | 358/310 |
| 4,485,401 | 11/1984 | Tan et al. | 358/141 |
| 4,517,597 | 5/1985 | Glenn | 358/12 |
| 4,543,607 | 9/1985 | Taylor et al. | 358/140 |
| 4,551,753 | 11/1985 | Nishizawa et al. | 358/140 |

FOREIGN PATENT DOCUMENTS

| | | |
|---|---|---|
| 1946199 | 4/1970 | Fed. Rep. of Germany . |
| 1536232 | 12/1978 | United Kingdom . |
| 2135851 | 5/1984 | United Kingdom .................. 358/41 |

OTHER PUBLICATIONS

T. Fujio and K. Kubota, "Transmission Primaries and Signal Forms", *NHK Technical Monograph*, Jun. 1982, pp. 27-34.
Campbell et al., "The Effect of Orientation on the Visual Resolution of Gratings", *Journal Physiology*, 1966, pp. 427-436.
Seyler et al., "Detail Perception After Scene Changes in Televison Image Presentations", *IEEE Transactions on Information Theory*, Jan. 1965.
Fujio et al., "High-Definition Television System-Signal Standard and Transmission", *SMPTE Journal*, Aug. 1980, pp. 579-584.
Timney et al., "Orientation Anisotropy: Incidence and Magnitude in Caucasian and Chinese Subjects", *Science*, 1976.
Appelle, "Perception and Discrimination as a Function of Stimulus Orientation: The Oblique Effect in Man and Animals", *Psychological Bulletin*, 1972.
Wendland, "Extended Definition Television with High Picture Quality", *SMPTE Journal*, Oct. 1983, pp. 1028-1035.
Sugimoto, "A Single Channel HDTV Broadcast System", presented to HDTV Subcommittee, Montreal, Quebec, Feb. 1984.
Glenn et al., "Compatible Transmission of High Definition Television Using Bandwidth Reduction", Proceedings, 37th Annual Broadcast Engineering Conference, 4/12/83.

*Primary Examiner*—John W. Shepperd
*Attorney, Agent, or Firm*—Martin M. Novack

[57] ABSTRACT

An apparatus and method for generating video signals using an improved camera system is disclosed. Video recording techniques which save bandwidth, and a temporal filter which is tailored to the eye's temporal response are also disclosed. In the camera apparatus, an optical means directs light from a scene to both a first video imaging device operating at a relatively fast frame rate and a second video imaging device operating at a relatively slow frame rate. The outputs of the two video imaging devices can be combined to obtain a high definition video signal.

46 Claims, 9 Drawing Figures

TELEVISION CAMERA AND RECORDING SYSTEM FOR HIGH DEFINITION TELEVISION HAVING IMAGERS OF DIFFERENT FRAME RATE

BACKGROUND OF THE INVENTION

This is a continuation-in-part of my U.S. patent application Ser. No. 597,482, filed 4-6-84 which is a continuation-in-part of my U.S. patent application Ser. No. 483,126 filed 4-8-83, now U.S. Pat. No. 4,628,344, which is, in turn, a continuation-in-part of my U.S. patent application Ser. No. 418,055 filed 9-14-82, now U.S. Pat. No. 4,517,597.

This invention relates to techniques for producing television signals and, more particularly, to an apparatus and method for producing electronic video signals representative of a scene, the signals including a high definition component that has a reduced bandwidth.

As described in the above-identified copending applications, an electronic video signal (television signal) can be encoded at reduced bandwidth by lowering the frame refresh rate of the high spatial frequency components, while maintaining the frame refresh rate of at least a portion of the low spatial frequency components at the standard rate. If done in a specified manner, this will not cause substantial degradation in the ultimately displayed image, since human vision cannot perceive changes in high spatial resolution information at as fast a rate as it can perceive changes in low spatial resolution information. Accordingly, as has been previously set forth, an electronic video encoding and decoding system can be devised which takes advantage of this, and other, characteristics of human vision by encoding higher spatial resolution video components to be at a temporal information rate which approximately corresponds to the highest rate actually perceived by human vision for such components; thereby eliminating the need to encode these components at a higher rate, which inherently wastes bandwidth. Also, as shown in the prior copending applications, the low spatial resolution information can be generated in a form which is compatible with standard television video, e.g. NTSC video.

It is among the objects of the present invention to provide an improved apparatus and method for generating electronic video signals having the previously described type of reduced bandwith features, including the generation of reduced bandwidth electronic video signals directly from an improved camera system. It is also among the objects of the present invention to provide an improvement in operation of electronic video systems by providing a certain type of temporal filtering which enhances the video image.

SUMMARY OF THE INVENTION

One form of the present invention is directed to an improved video camera system and method with a high definition capability. In accordance with the apparatus of this form of the invention, there is provided a video camera apparatus for generating video signals representative of images of a scene. First and second video imaging devices are provided. Optical means are provided for directing light from the scene to both of the first and second video imaging devices, such that they receive substantially the same optical image. Means are provided for scanning the first video imaging device at a relatively fast scan rate, typically, but not necessarily, a conventional 30 frames per second. Means are also provided for scanning the second video imaging device at a relatively slow scan rate, preferably not greater than 15 frames per second. Further means can be provided for recording, and/or transmitting, and/or displaying the outputs of the video imaging devices after further processing, to be described.

In an embodiment of this form of the invention, a color television camera and a monochrome television camera are provided and receive substantially the same optical image. The color television camera is scanned at a relatively fast rate, and the monochrome television camera is scanned at a relatively slow rate. An improved technique is also provided for recording the camera outputs, at reduced bandwidth as compared to a regular high definition television signal, on a video recording device having at least two recording channels, as follows: The luminance component signal from the color television camera (which is typically operating at conventional resolution and scan rate) is recorded on one of the recording channels of the video recording device. The output of the monochrome television camera (which may be a high definition camera operating at a slow scan rate) is combined with color component signals from the color television camera to obtain a combined signal, and this combined signal is recorded on the other channel of the video recording device.

In another embodiment of this form of the invention, four solid state video imaging devices are utilized. Two of the solid state video imaging devices are employed to respectively obtain the conventional resolution luminance signal and a high definition component of the luminance signal. The image on one of these video imaging devices is displaced by one diagonal pixel position with respect to the image on the other video imaging device. The other two video imaging devices are used to develop color signals and, again, the scan rates of the four video imaging devices are selected to save bandwidth while maintaining picture quality as perceived by the eye of the ultimate viewer.

As described in further detail below, there are a number of advantages which follow from the techniques hereof, including the following:

(a) Since it is not necessary to derive the standard resolution information from a fast scan of the high resolution camera, the high resolution camera can be scanned at the slow scan rate at which the high resolution information is to be recorded and/or transmitted. Accordingly, there is more time for light to be integrated at each elemental area of the high definition camera's photosensitive surface; thereby enhancing the signal-to-noise ratio of the high resolution signal. Also, it is not necessary to subsequently reduce the frame refresh rate of the high definition information to obtain the desired reduced bandwidth high definition components for recording and/or transmission.

(b) As described in the above-referenced copending U.S. patent applications, due to the characteristics of human vision it is not necessary to present the color information with as much spatial or temporal resolution as the luminance information. Accordingly, the high resolution camera can be a monochrome camera, which utilizes, for example, a single camera tube or imaging chip, thereby reducing expense and complexity.

(c) Since a conventional interlaced scan can be used for the standard resolution camera, a progressive (non-interlaced) scan can be used for the high definition camera, thereby resulting in enhanced high resolution performance, particularly when camera tubes (rather than solid state imagers) are employed.

In another form of the invention, there is provided an improved technique for temporally processing a video signal by providing temporal enhancement that is tailored to fit the temporal responsiveness of the human eye.

Further features and advantages of the invention will become more readily apparent from the following detailed description when taken in conjunction with the accompanying drawings.

DESCRIPTION OF THE PREFERRED EMBODIMENTS

Figure 1:
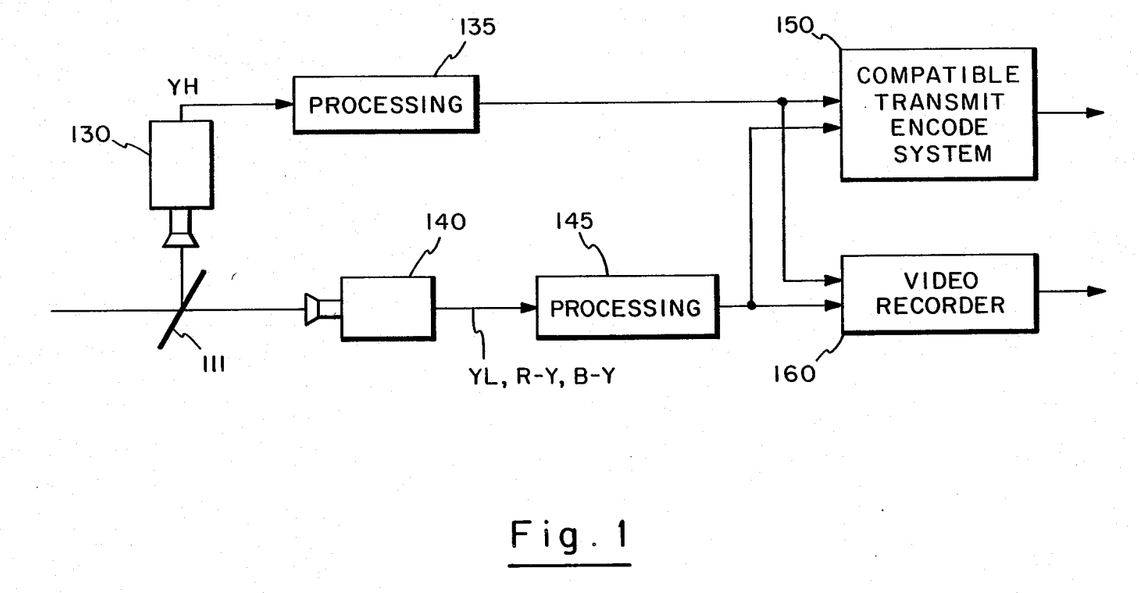
FIG. 1 is a block diagram, partially in schematic form, of an apparatus in accordance with a form of the invention, and which can be used to practice a form of the method of the invention.

FIG. 1 illustrates a simplified embodiment of a video camera system with high definition capability, in accordance with a form of the invention. Light received from a scene being viewed is split by a beam splitter 111 into beams that are respectively received by video image sensors 130 and 140 which, in this illustrated embodiment, are television cameras. The camera 140 is a standard resolution color television camera operating at a standard scan rate; i.e. at 30 interlaced frames (2 interlaced fields per frame) per second. The outputs of camera 140 are designated as the standard or low resolution luminance signal, YL, and color difference signals, R−Y and B−Y. The television camera 130, in this embodiment, is a high definition monochrome television camera which may have, for example, 1,050 lines of resolution (as compared to the standard 525 lines of resolution for camera 14). The high resolution camera 13 is scanned at a slower scan rate than the other camera; for example a scan rate of 7.5 or 15 frames per second.

Figure 2:
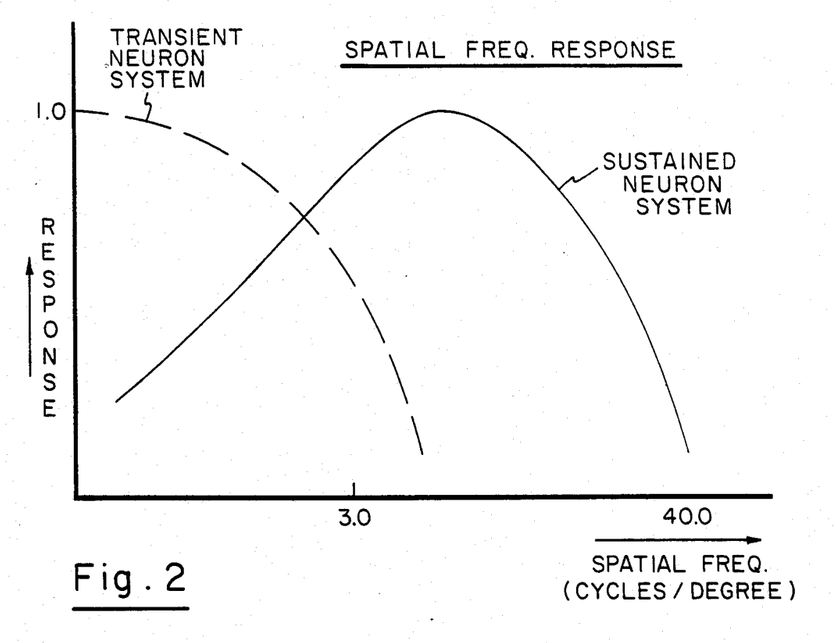
FIG. 2 is a graph of the spatial frequency response of the transient neuron system and the sustained neuron system of human vision.
Figure 3:
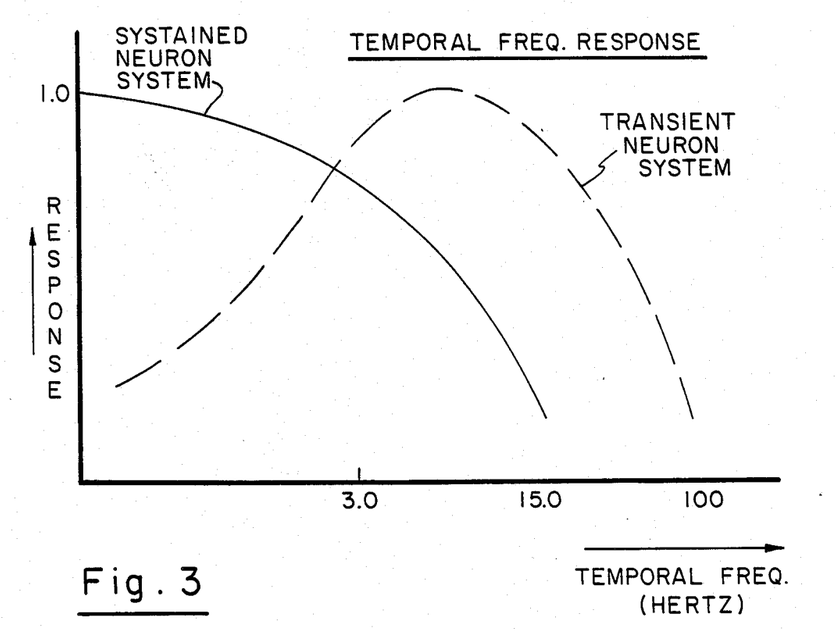
FIG. 3 is a graph of the temporal frequency response of the transient neuron system and the sustained neuron system of human vision.

As described in detail in copending U.S. patent application Ser. No. 597,482, assigned to the same assignee as the present application, it has been found that two different types of neuron systems or channels are used in vision. One type of neuron system, which detects low resolution imagery is relatively sensitive to temporal transients and has a time constant for build-up and decay of information that is believed to be about 40 to 80 milliseconds. A second type of neuron system is apparently used for transmitting relatively high resolution information from the fovea. This neuron system is believed to have a time constant of about 200 to 350 milliseconds. FIGS. 2 and 3 show the spatial and temporal response of these two systems in humans. These channels have been referred to as "transient" and "sustained" neuron systems. The sustained system is specialized for pattern detection. It has a relatively poor temporal response but relatively good resolution. The transient system is specialized for motion detection. It has relatively poor resolution but relatively good temporal response. In addition to the normal response, a transient caused by motion reduces perception in both systems for a period of about 300 milliseconds. As described in the referenced copending U.S. patent applications, an encoding system can be designed to have spatial and temporal characteristics which match the human visual system, and results in a saving of bandwidth. In the present invention the characteristics of the camera system, along with spatial and/or temporal filtering provide this match, and other advantages. Also, an enhanced temporal filtering technique which can be used with the previously disclosed encoder, or with the present camera system, or with conventional television processing, is set forth.

Referring again to FIG. 1, the outputs of television cameras 130 and 140 are respectively coupled to processing circuitry designated by the blocks 135 and 145, the respective natures of which will be described hereinbelow in conjunction with the more detailed block diagrams. The high definition luminance signal output from processing circuitry 135, and the low (or standard) resolution luminance and color difference signals are shown in the simplified diagram of FIG. 1 as being coupled to transmit circuitry 150 and to video recording circuitry 160. The nature of the processing circuits will be described in further detail hereinbelow. Also, it will be understood that the techniques for storing, encoding, transmitting, receiving, and decoding, as described in the above-referenced copending U.S. patent applications, can be utilized in conjunction with the invention hereof.

A form of the present invention, which utilizes high and low (or standard) resolution video image sensors, such as the two television cameras of FIG. 1, scanned at different rates, has a number of operational advantages, including the following:

(a) Since it is not necessary to derive the low (or standard) resolution information from a fast scan (e.g. the 30 frames per second conventional scan rate) of the high resolution camera (since such information can be obtained from the separate low resolution camera scanned at the standard scan rate), the high resolution camera can be scanned at the slow scan rate (for example, 7.5 or 15 frames per second) at which the high resolution information is to be recorded and/or transmitted. Accordingly, there is more time for light to be integrated at each elemental area of the camera's photosensitive surface; thereby enhancing the signal-to-noise ratio of the high resolution signal. Also, it is not necessary to subsequently reduce the frame refresh rate of the high definition information to obtain the desired reduced bandwidth high definition components for recording and/or transmission. [It may be desirable in some circumstances, however, to "oversample" the high definition signal, such as at a field rate of 15 frames per second, and then temporally integrate down to 7.5 field per second.]

(b) As described in the above-referenced copending U.S. patent applications, due to the characteristics of human vision it is not necessary to present the color information with as much spatial or temporal resolution as the luminance information. Accordingly, the high resolution camera can be a monochrome camera, which utilizes, for example, a single camera tube or imaging chip, thereby reducing expense and complexity.

(c) Since a conventional interlaced scan can be used for the low (or standard) resolution camera, a progressive (non-interlaced) scan can be used for the high definition camera, thereby resulting in enhanced high resolution performance, particularly when camera tubes (rather than solid state imagers) are employed.

Figure 4:
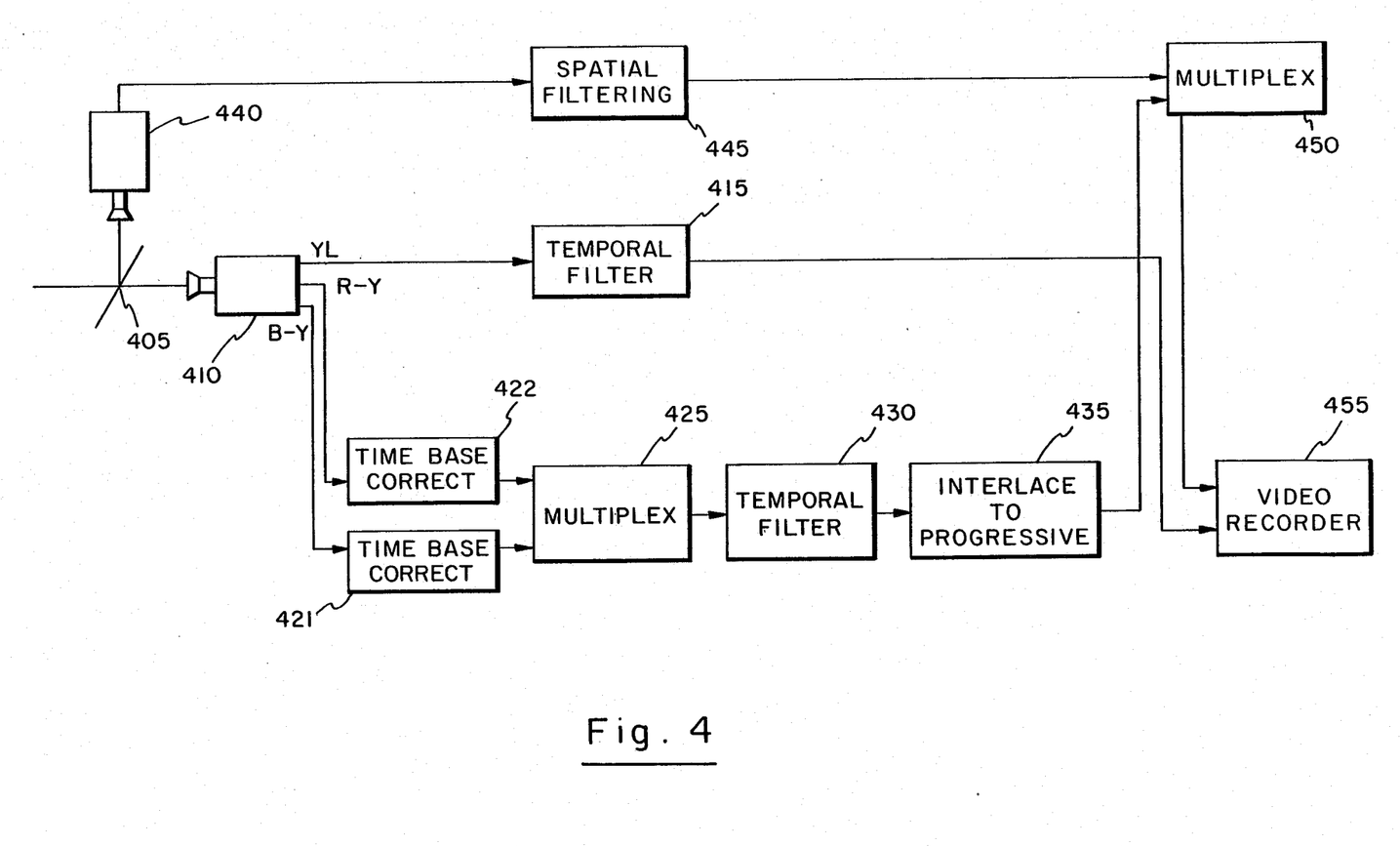
FIG. 4 is a block diagram, partially in schematic form, of a video camera and recording system in accordance with an embodiment of the invention and which can be used to practice a form of the method of the invention.
Figure 5:
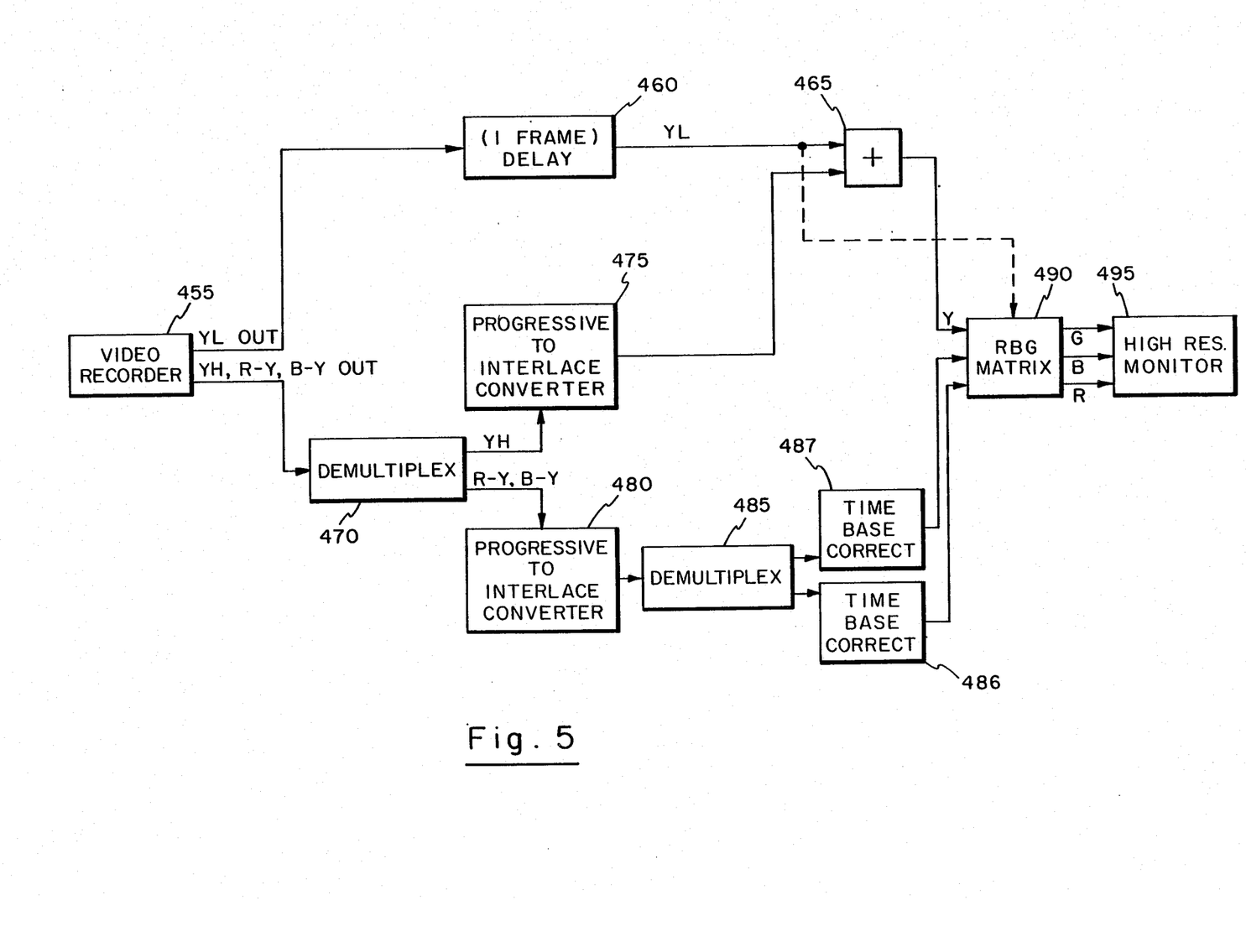
FIG. 5 is a block diagram of an embodiment of an apparatus for playback of the video recording of FIG. 4.

FIGS. 4 and 5 show a video recording and playback system which includes features of a form of the invention. In the recording system of FIG. 4, televison cameras 410 and 440 are provided, as in FIG. 1. In this embodiment, the camera 440 is a high resolution (e.g. 1050 lines) monochrome camera which is progressively scanned at 15 frames per second, and the camera 410 is a low (standard) resolution (525 lines) camera which is scanned (for NTSC) at 30 interlaced frames (60 fields) per second. The television cameras 410 and 440 are optically registered on the scene. In this embodiment, the cameras receive light from the scene via beam splitter 405. Preferably, the television cameras are synchronized electronically; i.e. their sync and drive signals are derived from common timing signals, although the field rate of camera 410 is four times faster. The outputs of camera 410 are designated YL, R−Y, and B−Y. The low (standard) resolution luminance signal is coupled to a temporal filter 415, which may include enhanced temporal filtering, of the type described hereinbelow, which is matched to the temporal sensitivity of human vision. The output of temporal filter 415 is one input to a two channel video recorder 455, which may be for example a "Betacam" type of video recorder manufactured by Sony Corp., or any suitable video recorder having two or more simultaneous recording channels. The color difference signals are respectively coupled to time base correctors 421 and 422. In the present embodiment time base corrector 422, which receives the R−Y color difference signal, is operative to compress the time base of each scanline of the R−Y signal to ⅜ of its original time base period, and the time base corrector 421 is operative to compress the time base of each scanline of the B−Y signal to ¼ of its original time base period. The outputs of time base correctors 421 and 422 are coupled to multiplexer 425, which operates to multiplex the time base corrected color difference signals, so as to put them in time series on a single output line. This output is, in turn, coupled to temporal filter 430. The temporal filter 430 may be a simple frame averager, of the type described in the above-referenced copending U.S. patent application Ser. No. 597,482, and employed, inter alia, for further bandwidth reduction of these signals. The output of temporal filter 430 is coupled to interlace-to-progressive converter circuit 435, which comprises a frame store that is read into in interlaced fashion, and read out of progressively, as known in the art. The output of interlace-to-progressive circuit 435 is one input to multiplexer 450. The multiplexer 450 operates to alternate the spatially filtered high definition scanlines with the scanlines from interlace-to-progressive circuit 435; i.e. one scanline from circuit 445 and then one scanline from circuit 435, and so on. It will be understood that in this and other embodiments, suitable equalizing delays can be provided as is known in the art, to equalize the signal traversal times.

As noted above, the high definition camera 440 is scanned, in the present embodiment, at 15 frames per second, progressive. The output of camera 440 is coupled to spatial filtering circuitry 445. As described in my above-referenced copending application Ser. No. 597,482, bandwidth can be saved by subtracting low definition components from the high definition signal before the recording or transmission thereof. Exemplary circuitry for achieving this function, in both the horizontal and vertical directions, is described in detail in said copending U.S. patent application. The output of spatial filtering circuitry 445, which now contains the high definition component at 525 lines, is coupled to the other input of multiplexer 450. The output of multiplexer 450 is coupled to the second channel input of video recorder 455.

Referring to FIG. 5, there is shown an embodiment of a video play back system for use in conjunction with the video recording system of FIG. 4. The channel which carries the low (standard) definition luminance signal is coupled to delay circuit 460 which provides a frame delay to equalize for the progressive-to-interlace conversion in the other channel, as well as any other necessary equalizing delay. The output of delay circuit is one input to summing circuit 465. The other channel of recorded video is coupled to demultiplexer 470 which separates the high definition luminance from the color difference signals (i.e., the opposite function to that performed by multiplexer 450 of FIG. 4) by routing successive alternating scanlines to its two output lines. The color difference signals, which are still in the progressive form in which they were recorded, are coupled to progressive-to-interlace converter circuit 480, the output of which is coupled to demultiplexer 485 whose outputs are in turn coupled to time base correctors 486 and 487. These circuits operate to perform the inverse function of the circuits 421, 422 and 425 of FIG. 4; i.e., to separate and then expand back to their original time base the color difference signals R−Y and B−Y. The resultant color difference signals are input to conventional RBG matrix 490. The demultiplexed luminance component YH, which is also in the progressive scan form in which it was recorded, is coupled to another progressive-to-interlace converter 475. The output of progressive-to-interlace converter 475 is coupled to the other input of summing circuit 465, which operates to combine the low and high definition luminance components. The resultant composite luminance component is a further input to the matrix 490, which is used to obtain the color signals for driving a high resolution monitor 495. It will be understood that techniques described in the above referenced copending U.S. patent applications can be utilized, if desired, in the processing, combining, and/or separating of the high and low (or standard) definition signal components. Also, as represented by the dashed line in FIG. 5, the low (or standard) definition luminance can be coupled to the matrix 490 for use instead of the composite high definition luminance signal, such as in instances where conventional resolution output is all that is needed. In this same context, it will be understood that the recording system of FIG. 4 can be adapted for use with only the low (or standard) resolution camera when the circumstances call for such application.

Figure 6:
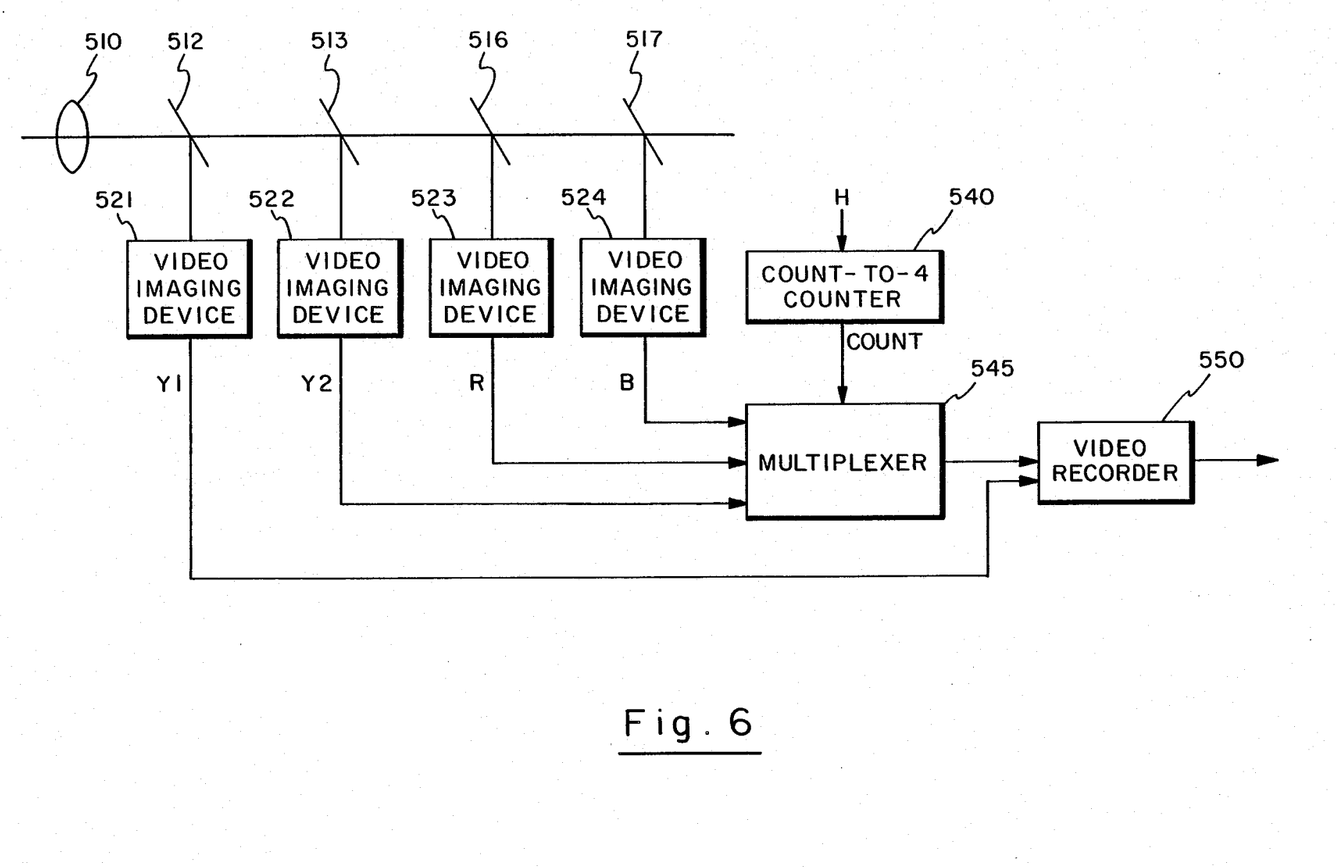
FIG. 6 is a block diagram, partially in schematic form, of another embodiment of a video camera and recording system in accordance with a form of the invention, and which can be used to practice a form of the method of the invention.

Referring to FIG. 6, there is shown an embodiment of another form of the invention in which the high resolution component is developed using a further image sensing device which has only conventional resolution capability. In this embodiment a camera is provided with an optical subsystem which divides the light from the image into four optically registered beams; namely two luminance beams designated Y1 and Y2, and red and blue component beams designated R and B, respectively. In the diagram of FIG. 6, 510 represents the camera lens system, 512 and 513 are beam splitters, and 516 and 517 are dichroic mirrors from which red and blue components are obtained (the green component not being used in this example). It will be understood that there are various alternative ways, for example using dichroic prisms, of splitting the light from the image into the desired luminance and color components.

Figure 7:
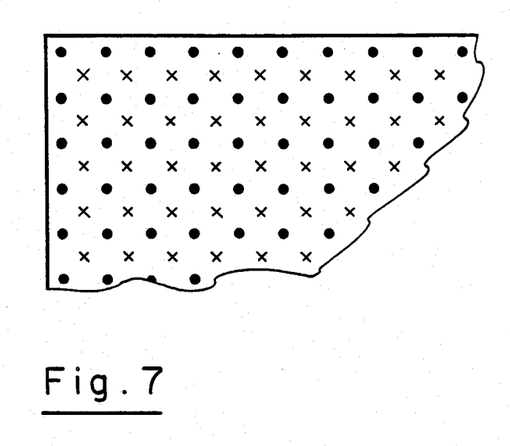
FIG. 7 is a broken-away diagram which shows a superposition of pixel positions of video imaging devices of FIG. 6.

In the embodiment of FIG. 6, four electronically synchronized and optically registered video imaging devices, such as devices having full frame resolution CCD camera chips, are provided, and are designated 521, 522, 523 and 524. The imaging devices 521 and 522 are used to obtain luminance component signals Y1 and Y2, respectively, and the imaging devices 523 and 524 are used to obtain color component signals R and B, respectively. The imaging device 522 is displaced with respect to the imaging device 521 (and also with respect to imaging devices 523 and 524) such that the image appearing thereon is diagonally displaced by one-half pixel with respect to the image appearing on the imaging device 521. This is illustrated in FIG. 7 wherein the pixel positions of the imaging devices 521 and 522 are shown superimposed, the pixel positions of the device 521 being represented by dots, and the pixel positions on the imaging device 522 being represented by x's.

By using the video signals output from the imaging devices 521 and 522, and combining them as will be further described hereinbelow, one can obtain a diagonally sampled image-representative signal with twice the vertical and twice the horizontal resolution of standard resolution television video. (See also in this regard my copending U.S. patent application Ser. No. 597,482.) In the present embodiment, the imaging device 521 is scanned in standard NTSC manner at thirty frames (two interlaced fields per frame) per second, so that the output thereof (Y1) can be utilized as the standard resolution luminance. Since the signal to be used for the high resolution component can be scanned at a slower rate, the imaging device 522 is scanned, in the present embodiment, at a rate of 7.5 interlaced frames (15 fields) per second. The imaging devices 523 and 524, which produce the red and blue component signals are also scanned at a slower rate. (In this regard, see again the referenced prior copending U.S. patent applications for the rationale as to why this can be done, and why the scan rate for blue can be lower than that for red.) In particular, the imaging device 523 is scanned at a rate of 15 interlaced frames (30 fields) per second, and the imaging device 524 is scanned at a rate of 7.5 interlaced frames (15 fields) per second.

The output of imaging device 521 is recorded on one channel of a two channel video recorder 550 which may, again, be for example a "Betacam" type video recorder, manufactured by Sony Corp. As previously described, temporal filtering may be provided in this channel. The outputs of the video imaging devices 522, 523 and 524 are multiplexed such that during every four conventional scanline periods there will be one scanline of Y1, one scanline of B and two scanlines of R. [This is consistant with Y1 and B being at ¼ the conventional scan rate and R being at ½ the conventional scan rate.] Toward this end, a count-to-four line counter 540 is provided. The counter is reset at the beginning of each field, by means not shown. A multiplexer 545 receives the inputs from the video imaging devices 522, 523 and 524. Respective counts of 1, 2, 3 and 4 from counter 540 causes the multiplexer 545 to select Y1, R, B, and then R again. The output of multiplexer 545 is recorded on the second channel of the video recorder 550.

Figure 8:
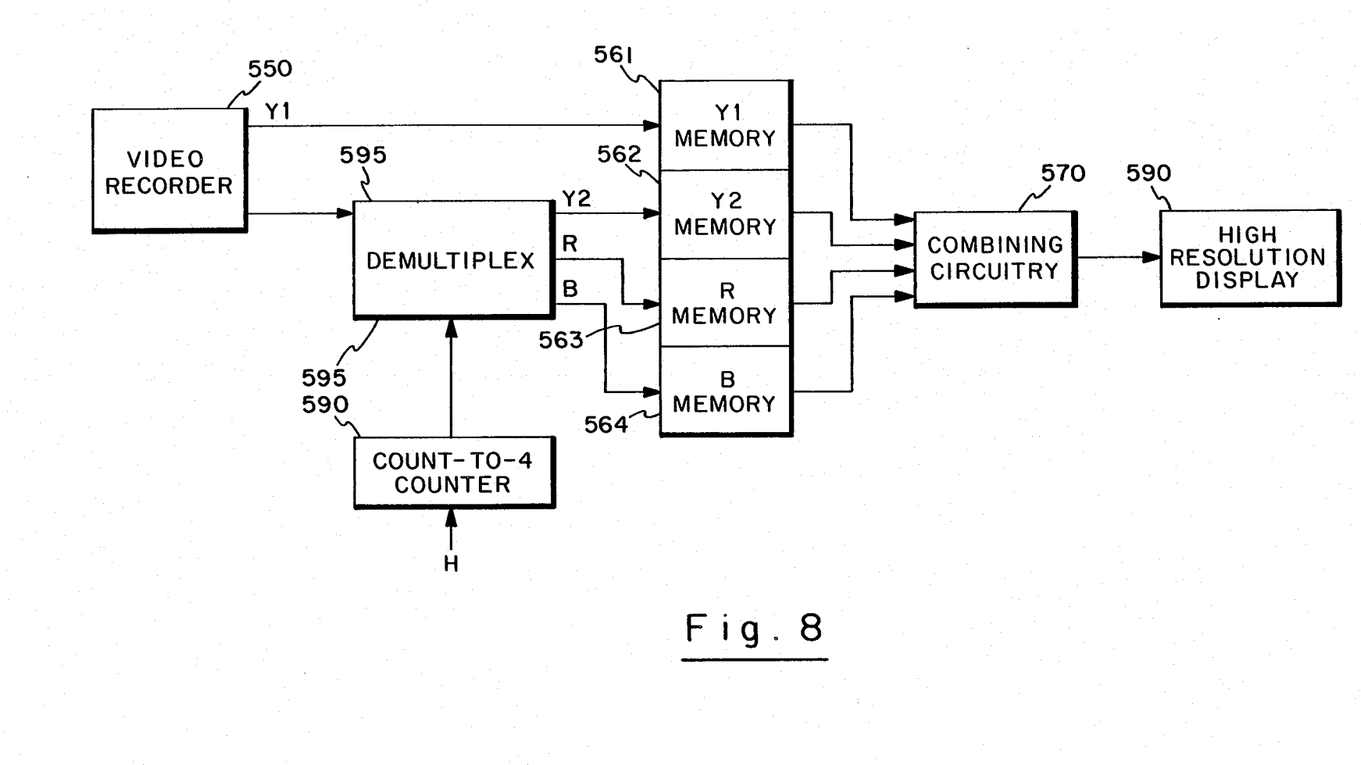
FIG. 8 is a block diagram of an embodiment of an apparatus for playback of the video recording of FIG. 6.

FIG. 8 illustrates an embodiment of a system for playing back the video information recorded on video recorder 550 of FIG. 6. Multi-ported video frame memories 561, 562, 563 and 564 are provided for the respective signals Y1, Y2, R and B. The luminance signal Y1 is coupled to frame memory 561. A count-to-four counter 590 is provided, which, as its counterpart in FIG. 6, counts scanlines and is reset each field. The counter controls selection by a demultiplexer 595 of a current scanline to be stored in the appropriate frame memory 562, 563 or 564. As in the recording portion of the circuitry, respective counts of 1, 2, 3 and 4 provide outputs to the memories for Y2, R, B and R, so that the recorded frames of information are recovered at the frame memories 562, 563 and 564. Combining circuitry 570, which may be of the type described in the above-referenced copending U.S. patent applications, is then utilized to obtain the high definition video signal, which can be displayed on high resolution display 590.

Applicant has determined that an important factor in the observed loss of sharpness of moving television images is that the television camera, for the low resolution image, has a reduced rather than increased high temporal frequency response (as does the transient neuron system of human vision—see FIG. 3). Accordingly, by selectively enhancing the temporal response of the low (or standard) resolution camera at around the peak of the human vision transient system's temporal response, which is around 10 Hertz, one can obtain moving images which appear sharper. To obtain a filter with a relatively flat temporal response and sharp cutoff, one can utilize a series of preferably at least three frame stores with both positive and negative coefficients that approximate the function $(\sin x)/x$.

Figure 9:
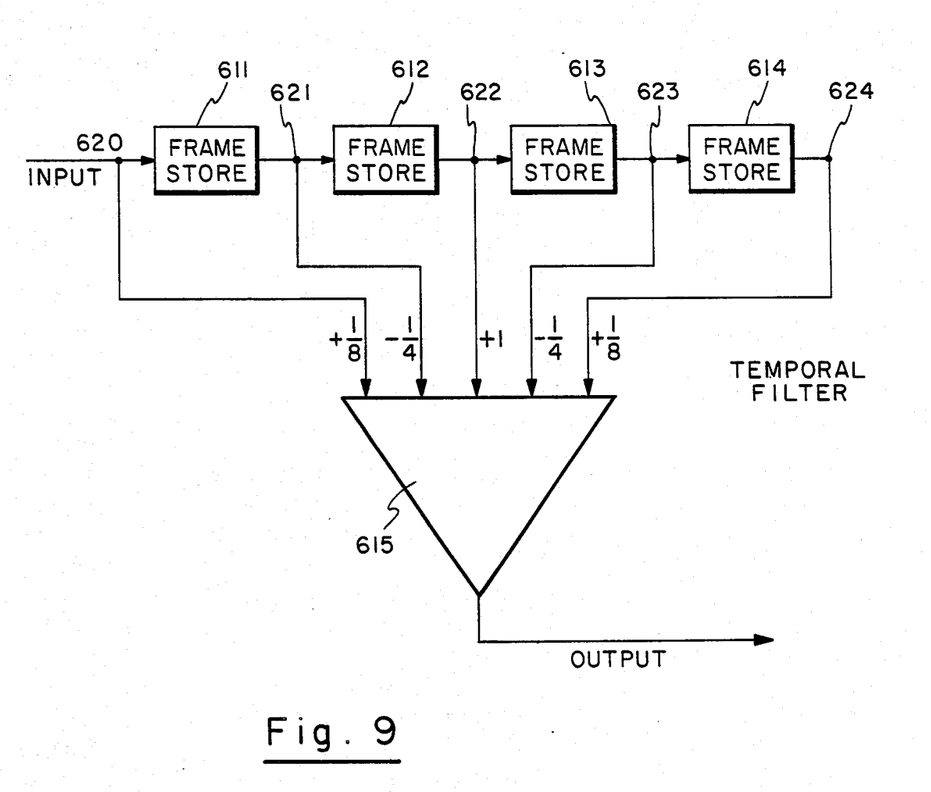
FIG. 9 is a block diagram of an enhancing temporal filter in accordance with a form of the invention.

Referring to FIG. 9, there is shown an example of a temporal filter of the type which may be utilized in the embodiment of FIG. 4, or the other forms of the invention, as well as in systems of the type described in the above-referenced copending U.S. patent applications, or in conventional television systems, for providing temporal enhancement of video signals. Four frame stores 611, 612, 613 and 614 are arranged in a series arrangement, with the input signal being coupled into this series string via frame store 611. The terminal at the input of frame 611 is designated 620, and the terminals at the outputs of frame stores 611, 612, 613 and 614 are respectively designated by reference numerals 621, 622, 623 and 624. The five illustrated terminals are coupled to respective weighted inputs of summing amplifier 615.

In the indicated example, the central terminal 622 (which can be considered, for purposes of understanding, as the real time image) is applied to the summing amplifier with a weight +1. The signals from adjacent terminals (i.e., separated in time from the real time image by one frame lead and one frame lag) are each applied to the summing amplifier 615 with respective weights of $-\frac{1}{4}$. Also, the signals from terminals 620 and 624, which respectively lead and lag the real time image by two video frames, are each applied to the summing amplifier 615 with a weight of $+\frac{1}{8}$.

In operation, the described temporal filter provides enhancement temporally in the low definition channel in a manner that is somewhat like what an image enhancer does spatially by subtracting signal on either side of an elemental region where detail is to be emphasized.

The embodiment of FIG. 9 utilizes four frame stores, and with the weights set forth will provide a peak temporal response slightly above 10 Hz. The peak response can be lowered by using more frame stores, and the weighting factors can be selected to further tailor the enhancement to the peak temporal response of the eye, while maintaining a desirable response curve shape.

The invention has been described with reference to particular preferred embodiments, but variations within the spirit and scope of the invention will occur to those skilled in the art. For example, it will be understood that suitable equalizing delays can be provided in the various embodiments, as necessary. Further, while certain of the techniques hereof are illustrated in the context of video recording systems, it will be understood that these techniques may also have application with respect to direct display and/or transmission and/or recording on other types of storage media.

I claim:

1. Video camera apparatus for generating video signals representative of images of a scene, comprising:
   a first video imaging device;
   a second video imaging device;
   optical means for directing light from said scene to said first and said second video imaging devices;
   means for scanning said first video imaging device at a relatively fast frame rate;
   means for scanning said second video imaging device at a relatively slow frame rate; and
   means for combining components of the outputs of said first and second video-imaging devices.

2. Apparatus as defined by claim 1, wherein said optical means is operative to direct substantially the same optical image to said first and second video imaging devices.

3. Apparatus as defined by claim 2, wherein said relatively fast frame rate is 30 frames per second, and said relatively slow frame rate is not greater than 15 frames per second.

4. Apparatus as defined by claim 2, further comprising means for transmitting the outputs of said first and second imging devices.

5. Apparatus as defined by claim 2, further comprising means for recording the outputs of said first and second imaging devices.

6. Apparatus as defined by claim 2, wherein said second video imaging device has a higher spatial resolution than said first video imaging device.

7. Apparatus as defined by claim 2, wherein said video imaging devices are arranged to have substantially the same image on their respective photosensitive surfaces, the image on one of said video imaging devices being displaced by one diagonal pixel position with respect to the image on the other of said video imaging devices.

8. Apparatus as defined by claim 2, wherein said first video imaging device comprises a color television camera and said second video imaging device comprises a monochrome television camera.

9. Apparatus as defined by claim 8, wherein said means for scanning said color television camera comprises means for interlace scanning said color television camera, and wherein said means for scanning said monochrome television camera comprises means for progressive scanning said monochrome television camera.

10. Apparatus as defined by claim 2, further comprising means for temporally filtering the output of said first video imaging device with a temporal filter that has enhanced temporal response in the temporal frequency range in which the human eye has maximum responsiveness.

11. Apparatus as defined by claim 1, wherein said relatively fast frame rate is 30 frames per second, and said relatively slow frame rate is not greater than 15 frames per second.

12. Apparatus as defined by claim 11, further comprising means for transmitting the outputs of said first and second imaging devices.

13. Apparatus as defined by claim 11, further comprising means for recording the outputs of said first and second imaging devices.

14. Apparatus as defined by claim 11, wherein said second video imaging device has a higher spatial resolution than said first video imaging device.

15. Apparatus as defined by claim 11, wherein said video imaging devices are arranged to have substantially the same image on their respective photosensitive surfaces, the image on one of said video imaging devices being displaced by one diagonal pixel position with respect to the image on the other of said video imaging devices.

16. Apparatus as defined by claim 11, wherein said first video imaging device comprises a color television camera and said second video imaging device comprises a monochrome television camera.

17. Apparatus as defined by claim 16, wherein said means for scanning said color television camera comprises means for interlace scanning said color television camera, and wherein said means for scanning said monochrome television camera comprises means for progressive scanning said monochrome television camera.

18. Apparatus as defined by claim 11, further comprising means for temporally filtering the output of said first video imaging device with a temporal filter that has enhanced temporal response in the temporal frequency range in which the human eye has maximum responsiveness.

19. Apparatus as defined by claim 1, further comprising means for transmitting the outputs of said first and second imaging devices.

20. Apparatus as defined by claim 1, further comprising means for recording the outputs of said first and second imaging devices.

21. Apparatus as defined by claim 1, wherein said second video imaging device has a higher spatial resolution than said first video imaging device.

22. Apparatus as defined by claim 1, wherein said video imaging devices are arranged to have substantially the same image on their respective photosensitive surfaces, the image on one of said video imaging devices being displaced by one diagonal pixel position with respect to the image on the other of said video imaging devices.

23. Apparatus as defined by claim 1, wherein said first video imaging device comprises a colr television camera and said second video imaging device comprises a monochrome television camera.

24. Apparatus as defined by claim 23, wherein said means for scanning said color television camera comprises means for interlace scanning said color television camera, and wherein said means for scanning said monochrome television camera comprises means for progressive scanning said monochrome television camera.

25. Apparatus as defined by claim 1, further comprising means for temporally filtering the output of said first video imaging device with a temporal filter that has enhanced temporal response in the temporal frequency range in which the human eye has maximum responsiveness.

26. A method for generating video signals representative of images of a scene, comprising the steps of:
 directing light from the scene to first and second video imaging devices such that they receive substantially the same optical image;
 scanning the first video imaging device at a relatively fast frame rate;
 scanning the second video imaging device at a relatively slow frame rate; and
 combining components of the outputs of the first and second video imaging devices.

27. The method as defined by claim 26, wherein said relatively fast frame rate is 30 frames per second and said relatively slow frome rate is not greater than 15 frames per second.

28. The method as defined by claim 26, further comprising the step of transmitting the outputs of said first and second video imaging devices.

29. The method as defined by claim 26, further comprising the step of recording the outputs of said first and second imaging devices.

30. For use in conjunction with a video recording device having at least two recording channels, a method of recording video signals representative of images of a scene, comprising the steps of:
 directing light from the scene to a monochrome television camera and a color television camera such that the cameras receive substantially the same optical image;
 scanning the monochrome television camera at a relatively slow rate;
 scanning the color television camera at a relatively fast rate;
 recording a luminance component signal from said color television camera on one of the recording channels of said video recording device;
 combining an output of said monochrome television camera with color component signals from said color television camera to obtain a combined signal; and
 recording the combined signal on another channel of said video recording device.

31. The method as defined by claim 30, wherein said relatively fast scan rate is 30 frames per second and said relatively slow scan rate is not greater than 15 frames per second.

32. The method as defined by claim 31, wherein said step of scanning said monochrome television camera comprises progressively scanning said monochrome television camera, and wherein said step of scanning said color television camera comprises interlace scanning said color television camera.

33. The method as defined by claim 30, wherein said step of scanning said monochrome television camera comprises progressively scanning said monochrome television camera, and wherein said step of scanning said color television camera comprises interlace scanning said color television camera.

34. Video camera apparatus for generating video signals representative of images of a scene, comprising:
 first, second, third and fourth video imaging devices;
 optical means for directing light from said scene to all of video imaging devices such that they receive substantially the same image, with said third and fourth video imaging devices receiving different color components of the image, and the image on said first video imaging device being displaced by one diagonal pixel position with respect to the image on said second video imaging device;
 means for scanning said first video imaging device at a relatively fast scan rate; and
 means for scanning said second, third and fourth video imaging devices at relatively slow rates.

35. Apparatus as defined by claim 34, wherein said relatively fast scan rate is 30 frames per second, and said relatively slow scan rates are not greater than 15 frames per second.

36. Apparatus as defined by claim 34, further comprising means for combining components of the outputs of said first and second video imaging devices.

37. Apparatus as defined by claim 34, further comprising means for transmitting the outputs of said first and second imaging devices.

38. Apparatus as defined by claim 34, further comprising means for recording the outputs of said first and second imaging devices.

39. Apparatus as defined by claim 34, further comprising means for recording an output of said first video imaging device on one channel of a video recording device, and means for combining outputs of said second, third and fourth video imaging devices to obtain a combined signal, and for recording said combined signal on a second channel of said video recording device.

40. In a high definition video system a video camera apparatus for generating video signals representative of images of a scene, components of said video signals being combinable to obtain a high definition video signal, comprising:
 a first video imaging device;
 a second video imaging device;
 optical means for directing light from said scene to said first and said second video imaging devices;
 means for scanning said first video imaging device at a relatively fast frame rate; and
 means for scanning said second video imaging device at a relatively slow frame rate;
 components of the outputs of said first and second video imaging devices being combinable to obtain a high definition video signal.

41. Apparatus as defined by claim 40, wherein said relatively fast frame rate is 30 frames per second, and said relatively slow frame rate is not greater than 15 frames per second.

42. Apparatus as defined by claim 40, wherein said second video imaging device has a higher spatial resolution than said first video imaging device.

43. Apparatus as defined by claim 40, wherein said video imaging devices are arranged to have substantially the same image on their respective photosensitive surfaces, the image on one of said video imaging devices being displaced by one diagonal pixel position with respect to the image on the other of said video imaging devices.

44. Apparatus as defined by claim 40, wherein said first video imaging device comprises a color television camera and said second video imaging device comprises a monochrome television camera.

45. Apparatus as defined by claim 44, wherein said means for scanning said color television camera comprises means for interlace scanning said color television camera, and wherein said means for scanning said monochrome television camera comprises means for progressive scanning said monochrome television camera.

46. Apparatus as defined by claim 40, further comprising means for temporally filtering the output of said first video imaging device with a temporal filter that has enhanced temporal response in the temporal frequency range in which the human eye has maximum responsiveness.

* * * * *